(12) United States Patent
Best

(10) Patent No.: US 6,357,161 B1
(45) Date of Patent: Mar. 19, 2002

(54) DECOY MOTION DEVICE

(76) Inventor: Edward M. Best, Rte. 2, Box 133, Nevada, MO (US) 64772-9673

( * ) Notice: Subject to any disclaimer, the term of this patent is extended or adjusted under 35 U.S.C. 154(b) by 0 days.

(21) Appl. No.: 09/519,809

(22) Filed: Mar. 6, 2000

(51) Int. Cl.[7] ............................................. A01M 31/06
(52) U.S. Cl. ............................................................ 43/3
(58) Field of Search ........................... 43/2, 3; 114/294, 114/299

(56) References Cited

U.S. PATENT DOCUMENTS

| | | | |
|---|---|---|---|
| 1,831,286 A | 11/1931 | Chelini | 43/3 |
| 2,252,795 A | 8/1941 | Weems et al. | 43/3 |
| 2,457,295 A | 12/1948 | Woodhead | 43/3 |
| 2,555,815 A * | 6/1951 | Rawlins et al. | 43/3 |
| 2,622,360 A | 12/1952 | Bertram | 43/3 |
| 2,624,144 A | 1/1953 | Beverman | 43/3 |
| 2,726,469 A | 12/1955 | Becker | 43/3 |
| 2,752,715 A | 7/1956 | Miller | 43/3 |
| 2,793,456 A | 5/1957 | Argo | 43/3 |
| 2,814,146 A | 11/1957 | Propp | 43/3 |
| 2,849,823 A * | 9/1958 | Miller | 43/3 |
| 2,956,529 A * | 10/1960 | Samalion | 114/299 |
| 4,599,819 A | 7/1986 | Voges, Jr. et al. | 43/3 |
| 4,612,722 A | 9/1986 | Ferrell | 43/3 |
| 4,732,105 A * | 3/1988 | Fisher | 114/294 X |
| 4,910,905 A | 3/1990 | Girdley et al. | 43/3 |

OTHER PUBLICATIONS

"Quiver Magnet"—Believed to be from Popular Mechanics, Sep., 1948. p. 198.

* cited by examiner

Primary Examiner—Robert P. Swiatek
(74) Attorney, Agent, or Firm—Shook, Hardy & Bacon LLP

(57) ABSTRACT

A device for anchoring and moving a buoyant water fowl decoy consisting of a weighted base, a stabilizing component and an elongated member. The stabilizing component and elongated member are coupled to and extend from the base. To the base and the elongated member are attached connection elements for connecting the device to a water fowl decoy. A pulling line is also coupled to one of the connection elements. The pulling line extends from the connection member to the hunter's blind where the hunter may remotely actuate movement of the decoy.

11 Claims, 2 Drawing Sheets

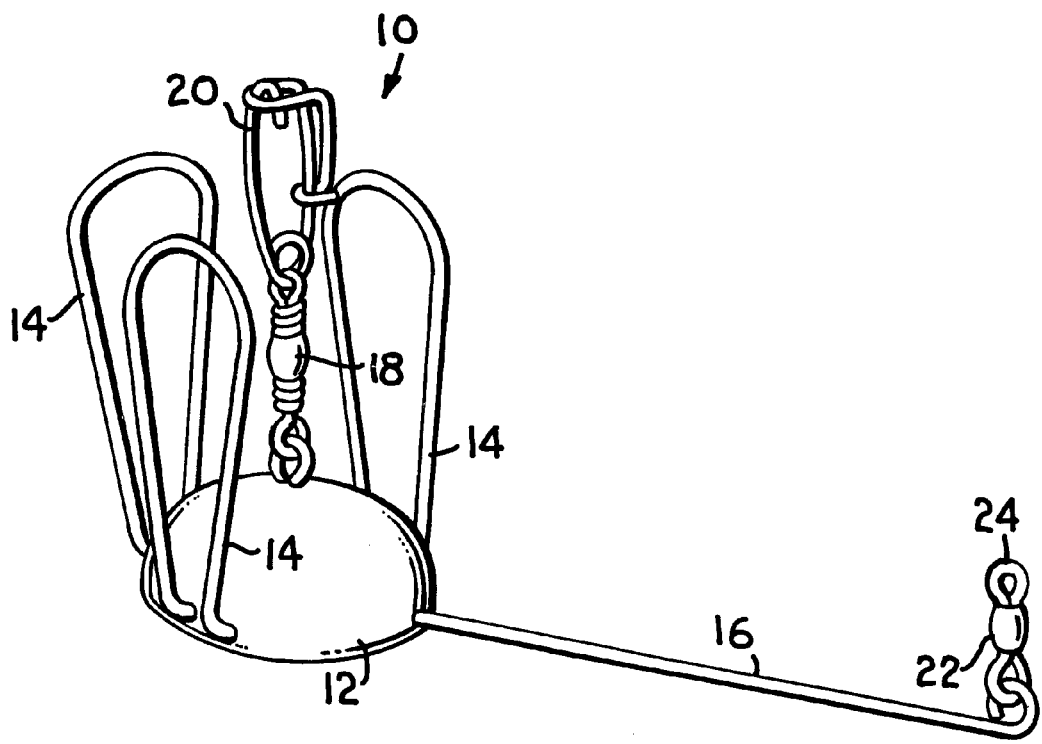

DECOY MOTION DEVICE

FIELD OF THE INVENTION

This invention relates to decoys, and, more particularly to devices for imparting motion to water fowl decoys.

CROSS REFERENCES TO RELATED APPLICATIONS

Not Applicable.

BACKGROUND OF THE INVENTION

Those engaged in the sport of hunting have long used decoys as a tactic for attracting live animals. This is particularly true of those engaged in water fowl hunting. Water fowl decoys are buoyant and when placed on the surface of a pond or other body of water, lure live water fowl into range of the hunter. There are decoys available which closely simulate the size and physical appearance of almost any water fowl. However, in addition to lifelike physical characteristics, it also is desirable that the decoys move in a lifelike manner on the surface of the water, as a decoy not engaging in any movement is ineffective for attracting fowl. Obviously, the more closely a decoy is able to imitate the movement of a live water fowl, the more successful the decoy will be in luring such fowl.

In windy conditions the natural motion imparted to a body of water will move even an otherwise stationary decoy. However, in conditions of little to no wind, a stationary decoy will remain still greatly decreasing its effectiveness. It is thus important to a hunter's success that a water fowl decoy include a device for imparting movement to the decoy in conditions of little to no wind.

Remaining inconspicuous is also important to a hunter's success. Consequently, it is preferred that decoys be located at a distance, often a substantial distance, from the hunter's blind. It thus follows that decoy motion devices which may be actuated by the hunter from such a remote distance are desirable.

Devices for imparting movement to water fowl decoys which are operable from a hunter's blind are known in the prior art. However, such devices are comparatively complex, expensive and difficult to set up for use. Some even require permanent installation. Further, such devices are bulky making transport, handling and storage difficult. Thus, there is a need for an inexpensive, collapsible water fowl decoy which may be remotely actuated from a hunter's blind and is relatively simple to set up for use.

SUMMARY OF THE INVENTION

Accordingly, it is an object of the present invention to provide a decoy motion device for inconspicuously imparting movement to water fowl decoys in conditions of little to no wind.

It is another object of the present invention to provide a decoy motion device which may be remotely actuated from a hunter's blind.

It is a further object of the present invention to provide a decoy motion device which is collapsible for easy transport, handling and storage.

It is yet another object of the present invention to provide a decoy motion device which is economical and relatively simple to set up for use.

According to the present invention, the foregoing and other objects and advantages are attained by an anchoring device for a buoyant water fowl decoy comprised of a weighted base, a stabilizing component on the base which projects outwardly therefrom, an elongated member protruding from the base which includes a portion that is spaced from the base, a first connection element on the base and adapted to be coupled to a decoy and a second connection element on the elongated member and adapted to be coupled to a decoy. The stabilizing component and elongated member may alternatively be fixed to the weighted base. It is preferred that the stabilizing component be comprised of a plurality of loops which project outwardly from the base. It is preferred further that each loop is moveable between this outwardly projecting position and a collapsed position.

In accordance with another aspect of the invention, a decoy device is provided which is comprised of a decoy, a weighted base, a stabilizing component on the base and projecting outwardly therefrom, an elongated member protruding from the base which includes a portion that is spaced from the base, a first connection element extending between the base and the decoy, a second connection element extending between the elongated member and the decoy, and a pulling line also coupled to the second connection element. The decoy device further may comprise a first line coupled between the first connection element and the decoy, and a second line coupled between the second connection element and the decoy, with the first and second lines coupled to the decoy at spaced locations. It is preferred that the second line and the pulling line are continuous. It is preferred further that the stabilizing component be comprised of a plurality of loops which project outwardly from the base and that each loop is moveable between this outwardly projecting position and a collapsed position. Additional objects, advantages and novel features of the invention will be set forth in part in a description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith:

FIG. 3 is a diagrammatical view of the decoy motion device of the present invention illustrating the stabilizing component in a collapsed position.

DETAILED DESCRIPTION OF THE PREFERRED EMBODIMENTS

Figure 1:
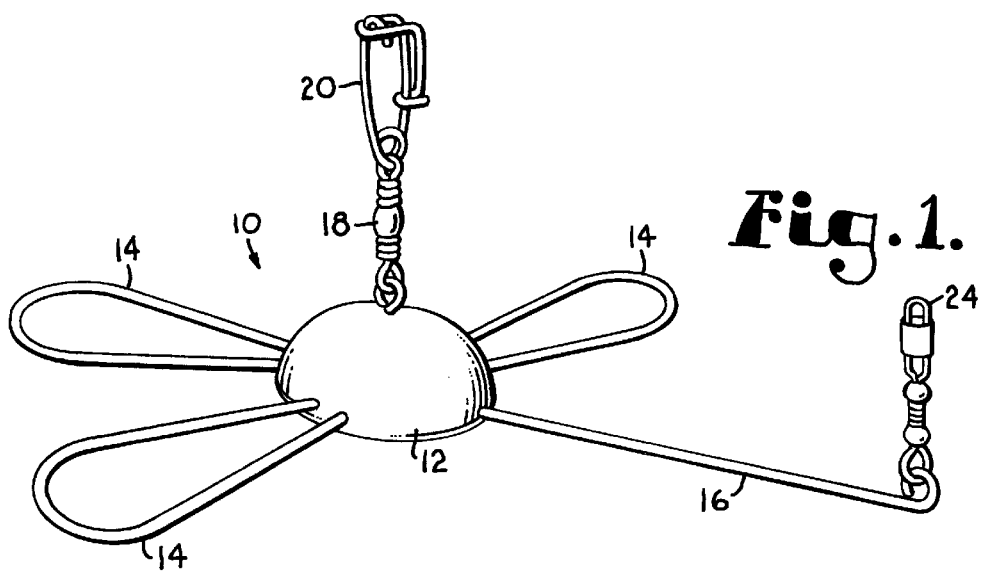
FIG. 1 is a diagrammatical view of the decoy motion device of the present invention.

Referring to the drawings in greater detail, and initially to FIG. 1, a decoy motion device which embodies the principles and concepts of the invention is designated generally by the number 10. Decoy motion device 10 may include a weighted base 12 to which a stabilizing component 14 and an elongated member 16 may be coupled. Weighted base 12 may be formed from any material which will effectively anchor a decoy to the bottom of a body of water, yet not disintegrate in the water. Preferably, weighted base 12 may be comprised of lead or bismuth. The size and weight of weighted base 12 may vary depending on the particular decoy used. For example, while an 8 oz. base may be adequate for smaller water fowl decoys, a 16 oz. or 24 oz. base may be required for magnum goose decoys. Stabilizing component 14 preferably projects outwardly from weighted base 12 and aids in preventing the base from tipping when it rests or is pulled along the bottom of a body of water. In the preferred embodiment shown in FIG. 1, stabilizing component 14 may include three separate and discrete portions, each projecting outwardly from weighted base 12. Each portion preferably may be formed from a length of malleable material shaped to form a loop which both begins and terminates at or near weighted base 12. The first two of these loops desirably may be positioned on opposed sides of base 12, approximately 180° from one another; however, the exact spacing of these loops is not considered to be a critical feature of the invention. The third loop desirably may be positioned between the first two loops, approximately 90° from each; however, the exact number, positioning and configuration of the loops is not significant so long as the loops operate to hold the decoy in position and permit controlled movement as explained below. Preferably, each portion of stabilizing component 14 may be formed from 10–12 gauge copper wire.

An elongated member 16 desirably may protrude from weighted base 12 in substantially a single direction. Elongated member 16 may be coupled to weighted base 12 at a location opposite the third loop of stabilizing component 14, such that the third loop and the elongated member are approximately 180° from one another. Consequently, elongated member 16 may be located approximately 90° from each of the first two loops of stabilizing component 14, however the exact spacing is not considered to be a critical feature of the invention. While elongated member 16 also may be comprised of copper wire, it is preferable to use a material which is still malleable but which has more rigidity than copper wire. Preferred materials are stainless or spring steel wire. The length of elongated member 16 varies depending on the decoy used. The length of the combination of weighted base 12 and elongated member 16 should closely approximate the length of the decoy, as one purpose of elongated member 16 is to provide the decoy with connection points which accommodate the decoy length.

In the preferred embodiment, stabilizing component 14 and elongated member 16 may be rigidly connected to weighted base 12, so as to present an essentially monolithic body, such body being formed through molding or casting. Typical molds of this type are manufactured by Do-It Corporation of Denver, Iowa. The molds preferably may consist of a cast aluminum head block hollowed out in the desired shape for the weighted base and include a port into which the desired molten material may be poured. Stabilizing component 14 and elongated member 16 may be positioned in the mold cavity and the molten metal poured so as to harden with stabilizing component 14 and elongated member 16 in proper position.

As elongated member 16 and each portion of stabilizing component 14 preferably are formed of a malleable material, decoy motion device 10 may be collapsible. In other words, elongated member 16 and each portion of stabilizing component 14 may be collapsed inward toward weighted base 12. Collapsing decoy motion device 10 in this manner results in a device that is much less bulky making transport, handling and storage more convenient.

In an alternative embodiment (not shown), stabilizing component 14 may include two portions spaced on opposite sides of weighted base 12 and positioned approximately 120° from one another. Elongated member 16 then is positioned between the two portions at approximately 120° from each. In this configuration, elongated member 16 may act as a stabilizing portion as well.

Decoy motion device 10 also may include a first connection element 18 coupled to base 12 and a second connection element 22 coupled to elongated member 16 at or near the portion of the elongated member that is spaced from weighted base 12. Connection elements 18 and 22 are preferably swivels, although any suitable connection element may be used. Swivels are preferred to prevent tangling of lines that may link the connection elements to a decoy as described below. In an alternative embodiment, one or both of connection elements 18 and 22 may be a swivel coupled to a clip 20, 24, for example, a trotline or snap clip.

Figure 2:
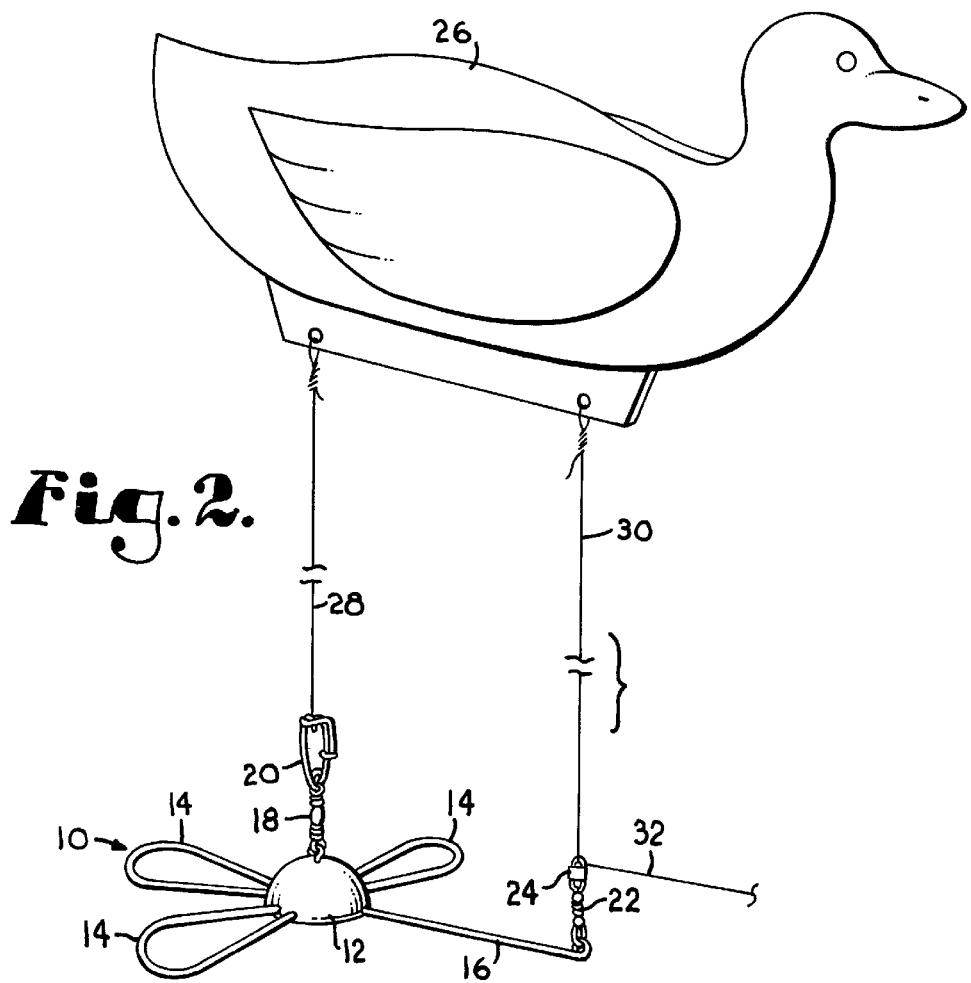
FIG. 2 is a diagrammatical view of the decoy motion device of the present invention operably attached to a water fowl decoy.

In the preferred embodiment, weighted base 12 may be positioned such that when the device is coupled to a decoy, weighted base 12 is at or near the rear end of the decoy with elongated member 16 extending toward the front end of the decoy as shown in FIG. 2. When live water fowl rest on the surface of a body of water, their natural inclination is to face into the wind. Thus, when the water fowl begins to move, the rear end of its body is positioned low into the water and the front end of its body is raised slightly above the rear end. Positioning decoy motion device 10 such that the weighted base 12 is near the rear end of the decoy, simulates this motion in a more lifelike manner than if weighted base 12 were positioned at or near the center or the front end of the decoy.

Decoy motion device 10 is adaptable to any water fowl decoy. While the circumstance would be unusual, in a shallow body of water, connection elements 18 and 22 may be connected directly to the underside of a decoy. In this embodiment (not shown), it is less important that the connection element be comprised of a swivel as there is no danger of tangling lines. Thus, an alternative connection element may be used. It is more common, however, that a length of line 28, 30 may be coupled at one end to each connection element 18, 22 and coupled at the opposite end to a decoy at spaced locations as shown in FIG. 2. Obviously, the lengths of lines 28 and 30 will vary depending on the depth of the body of water in which the water fowl decoy is being used. Whatever the length used, weighted base 12 should rest on the bottom of the body of water, thus anchoring the decoy 26. It is preferred that braided nylon or tangle free line be used for lines 28 and 30, although any line sufficient to connect decoy motion device 10 with decoy 26 will suffice. Due to its transparent character, lines 28 and 30 are most preferably 12–20 lb. monofilament.

In operation, decoy motion device 10 is attached to a water fowl decoy 26. The decoy is placed on the surface of a body of water and decoy motion device 10 sinks beneath the surface until weighted base 12 is resting on the bottom of the body of water. As stabilizing component 14 is coupled to weighted base 12, the base is stabilized on the bottom of the water from tipping and tangling the lines 28, 30. A pulling line 32 is coupled at one end to second connection element 22 which extends above the surface of the water and is held on its opposite end by the hunter in the hunter's blind. Thus, when the hunter increases tension on pulling line 32, the decoy moves. When the tension is relieved, the direct motion of decoy 26 ceases. However, due to the wave-like ripple effect created on the surface of the water by the movement of the decoy, the decoy will continue to move slightly for a short period of time. Non-attached decoys in the vicinity of the decoy attached to the motion device also maybe moved slightly by this ripple effect. In the preferred embodiment, line 30 and pulling line 32 may be one continuous length of line. In this embodiment, one end of the line is coupled to the decoy. The opposite end is threaded through connection element 22 and is held by the hunter in the hunter's blind. Due to its transparent character, the continuous line preferably is 12–20 lb. monofilament although any line with enough strength to move the decoy and decoy motion device may be used.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. An anchor device for a buoyant decoy, comprising:

a weighted base;

a stabilizing component on said base, wherein said stabilizing component projects outwardly from said base, wherein said stabilizing component is comprised of a plurality of loops, wherein each loop projects outwardly from said base forming a first position, and wherein each said loop is moveable between said first position and a second collapsed position;

an elongated member protruding from said base, said member including a portion that is spaced from said base;

a first connection element on said base and adapted to be coupled to the decoy; and a second connection element on said portion of said elongated member and adapted to be coupled to the decoy.

2. The device of claim 1, wherein each of said first and second connection elements is comprised of a swivel.

3. The device of claim 2, wherein each of said stabilizing component and said elongated member is comprised of wire.

4. An anchor device for a buoyant decoy, comprising:

a weighted base;

a stabilizing component fixed to said base, wherein said stabilizing component projects outwardly from said base, wherein said stabilizing component is comprised of a plurality of loops, wherein each said loop projects outwardly from said base forming a first position, and wherein each said loop is moveable between said first position and a second collapsed position;

an elongated member fixed to and protruding from said base, said member including a portion that is spaced from said base;

a first connection element on said base and adapted to be coupled to the decoy; and a second connection element on said portion of said elongated member and adapted to be coupled to the decoy.

5. The device of claim 4, wherein each of said first and second connection elements is comprised of a swivel.

6. The device of claim 5, wherein each of said stabilizing component and said elongated member is comprised of wire.

7. A decoy device, comprising;

a decoy;

a weighted base;

a stabilizing component on said base, wherein said stabilizing component projects outwardly from said base;

an elongated member protruding from said base, said member including a portion that is spaced from said base;

a first connection element extending between said base and said decoy;

a second connection element extending between said portion of said elongated member and said decoy; and a pulling line coupled to said second connection element.

8. The decoy device of claim 7, further comprising:

a first line coupled between said first connection element and said decoy; and a second line coupled between said second connection element and said decoy, wherein said first line and said second line are coupled to said decoy at spaced locations.

9. The decoy device of claim 8, wherein said second line and said pulling line are continuous.

10. The decoy device of claim 9, wherein said stabilizing component is comprised of a plurality of loops, wherein each said loop projects outwardly from said base forming a first position, and wherein each said loop is moveable between said first position and a second collapsed position.

11. The decoy device of claim 10, wherein each of said first and second connection elements is comprised of a swivel.

* * * * *